United States Patent
Osogami et al.

(10) Patent No.: US 9,429,924 B2
(45) Date of Patent: *Aug. 30, 2016

(54) CONTROLLING POWER GENERATORS AND CHILLERS

(75) Inventors: Takayuki Osogami, Kanagawa-ken (JP); Hiroki Yanagisawa, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 673 days.

This patent is subject to a terminal disclaimer.

(21) Appl. No.: 13/533,325

(22) Filed: Jun. 26, 2012

(65) Prior Publication Data

US 2013/0345889 A1 Dec. 26, 2013

(51) Int. Cl.
*G06F 5/00* (2006.01)
*G05B 15/02* (2006.01)

(52) U.S. Cl.
CPC ....... *G05B 15/02* (2013.01); *G05B 2219/2614* (2013.01)

(58) Field of Classification Search
CPC . G05B 15/02; G05B 2219/2614; G06F 1/26; G05F 5/00
USPC .................. 700/286, 291, 295; 705/400, 412
See application file for complete search history.

(56) References Cited

U.S. PATENT DOCUMENTS

| | | | |
|---|---|---|---|
| 5,148,365 A * | 9/1992 | Dembo | 705/36 R |
| 5,729,466 A * | 3/1998 | Bamji | 716/122 |
| 5,974,403 A * | 10/1999 | Takriti et al. | 705/412 |
| 6,021,402 A | 2/2000 | Takriti | |
| 6,763,276 B1 * | 7/2004 | Perry | 700/97 |
| 7,454,270 B2 * | 11/2008 | Mansingh et al. | 700/291 |
| 7,478,070 B2 * | 1/2009 | Fukui et al. | 705/412 |
| 7,489,990 B2 * | 2/2009 | Fehr et al. | 700/291 |
| 8,069,077 B2 * | 11/2011 | Iino et al. | 705/7.31 |
| 2007/0088447 A1 * | 4/2007 | Stothert et al. | 700/36 |
| 2009/0093916 A1 * | 4/2009 | Parsonnet | F24F 5/0017 700/286 |
| 2011/0066299 A1 * | 3/2011 | Gray et al. | 700/291 |
| 2011/0087381 A1 * | 4/2011 | Hirato | G05B 13/024 700/291 |
| 2011/0159389 A1 * | 6/2011 | Ohara | F24D 19/1048 429/429 |
| 2012/0150679 A1 * | 6/2012 | Lazaris | G06Q 30/0605 705/26.2 |
| 2012/0259469 A1 * | 10/2012 | Ward et al. | 700/276 |

(Continued)

FOREIGN PATENT DOCUMENTS

| | | | | |
|---|---|---|---|---|
| JP | 11175504 A | * | 7/1999 | G06F 17/00 |
| JP | 2003113739 A | | 4/2003 | |

(Continued)

*Primary Examiner* — M. N. Von Buhr
(74) *Attorney, Agent, or Firm* — Cantor Colburn LLP; Vazken Alexanian

(57) ABSTRACT

A method of meeting a power demand of a power consumption unit is disclosed. A forecasted power demand for a power demand scenario for the power consumption unit is determined and a probability of occurrence of the power demand scenario is determined. An objective function for operating at least one power supply device is created that includes the forecasted power demand of the power demand scenario and the determined probability of occurrence of the power demand scenario. A substantial minimum of the objective function is located to determine a schedule for operating the at least one power supply device to meet the forecasted power demand. The at least one power supply device may be operated according to the determined schedule to meet the power demand of the power consumption unit.

18 Claims, 4 Drawing Sheets

(56) References Cited

U.S. PATENT DOCUMENTS

| | | | |
|---|---|---|---|
| 2013/0238294 A1* | 9/2013 | Legbedji et al. | 703/2 |
| 2013/0307273 A1* | 11/2013 | Afremov | F03G 6/02 290/52 |
| 2013/0345890 A1* | 12/2013 | Osogami et al. | 700/291 |
| 2014/0039708 A1* | 2/2014 | Curtis | F02D 25/00 700/288 |

FOREIGN PATENT DOCUMENTS

| | | | | |
|---|---|---|---|---|
| JP | 2005004435 A | * | 1/2005 | G05B 13/02 |
| JP | 2005257097 A | | 9/2005 | |
| JP | 2008146105 A | * | 6/2008 | G06Q 50/00 |
| JP | 2009294969 A | * | 12/2009 | G06Q 50/00 |

* cited by examiner

CONTROLLING POWER GENERATORS AND CHILLERS

BACKGROUND

The present invention relates generally to power generation and planning and more specifically to methods of supplying power to satisfy a stochastic energy demand.

Buildings and factories generally have power demands for running various equipment, as well as for operating heating and cooling systems that provide a comfortable environment for its inhabitants. Often, such buildings have electric generators and/or batteries that may be used during peak demand to generate electricity to supplement electricity supplied from electric companies. In addition, the buildings have heating and cooling units that may include chillers and/or heat storage devices as components to the heating and cooling system. Electricity generally is used to power electrical appliances, such as lights, fans, computers or electrical factories equipment, etc., as well as to provide power to the chillers of the heating and cooling systems. The electricity and heating demands of these buildings are generally stochastic, or indeterminate in nature.

SUMMARY

According to one embodiment, a method of meeting a power demand of a power consumption unit includes: determining, using a processing device, a forecasted power demand for a power demand scenario for the power consumption unit; determining a probability of occurrence of the power demand scenario; creating an objective function for operating at least one power supply device that includes the forecasted power demand of the power demand scenario and the determined probability of occurrence of the power demand scenario; locating a substantial minimum of the objective function to determine a schedule for operating the at least one power supply device to meet the forecasted power demand; and operating the at least one power supply device according to the determined schedule to meet the power demand of the power consumption unit.

According to another embodiment, a method of determining a power demand of a power consumption unit includes: determining, using a processing device, a forecasted power demand for a selected power demand scenario for the power consumption unit; determining a probability of occurrence of the selected power demand scenario; creating an objective function for operating at least one power production device to meet the forecasted power demand and the determined probability of occurrence of the selected power demand scenario; and finding a substantial minimum of the objective function to determine a schedule for operating the at least one power production device according to the determined power demand.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
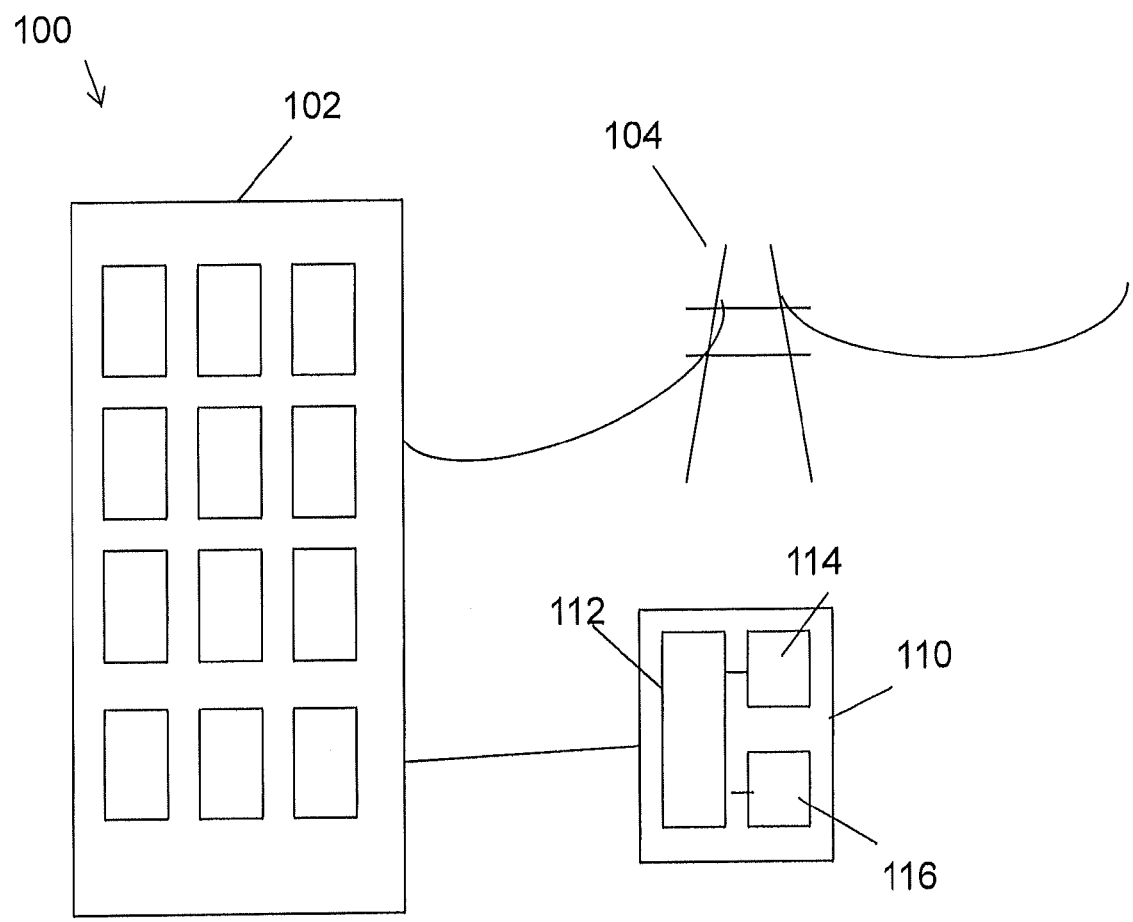
FIG. 1 shows an exemplary system for supplying power to a power consumption unit.

FIG. 1 shows an exemplary system 100 for supplying power to a power consumption unit 102. In various embodiments, the power consumption unit 102 includes a building that is coupled to an electricity grid 104 for receiving electrical power. The building unit further includes local power generation systems as specified with respect to FIG. 2 below for providing supplemental power. The building unit may further include heating and cooling systems in various embodiments. A control unit 110 is coupled to the power consumption unit 102 for controlling various operations at the power consumption unit 102. In one aspect, the control unit 110 may be a computer-based system that includes one or more processors (such as microprocessors) 112, one or more data storage devices (such as solid state memory, hard drives, tape drives, etc.) 114 for storing programs or models and data, and computer programs and models 116 for use by the processor 112. In one aspect, the control unit 110 may receive signals from various power systems of the building unit and/or may be coupled to the power systems to operate the power systems. The control unit 110 performs various calculations for operating the power systems of the building unit according to various methods disclosed herein. In one aspect, the control unit 110 may determine a schedule for operating the various power systems. In another aspect, the control unit 110 may control the various power systems according to the determined schedule.

Figure 2:
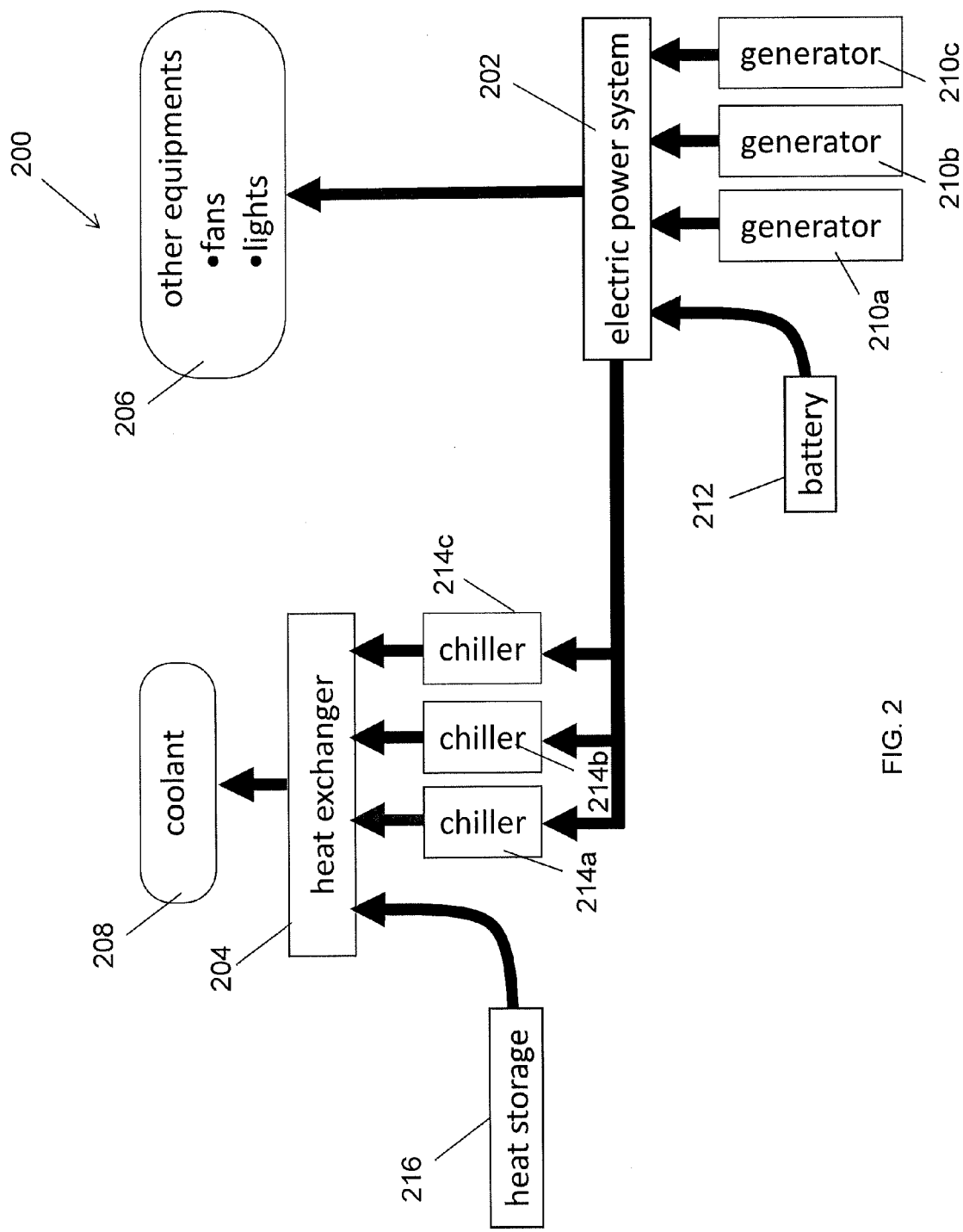
FIG. 2 shows a schematic diagram illustrating exemplary electrical power systems and cooling/heating units for the exemplary power consumption unit of FIG. 1.

FIG. 2 shows a schematic diagram 200 illustrating exemplary electrical power systems and cooling/heating units for the exemplary power consumption unit 102. In general, the building unit may have heating and cooling power demands with respect to regulating a temperature or environment of the building unit as well as electrical demands for operation of various appliances and machinery. The schematic diagram 200 includes an electrical power system 202 that may receive electricity from outside sources via the electricity grid 104. Exemplary local generators 210a-210c and exemplary battery 212 may also supply electricity to the power system 202. The local generators 210a-210c are typically turned on or off based on power demands of the building unit. Similarly, batteries 212 may be coupled or decoupled from the electrical power system 202 according to power demands of the building unit. Generators 210a-210c generally ramp up over a period of time before they are available for use. Thus, it is useful to be able to know the power demands of the building unit ahead of time. The electrical power system 202 supplies electricity to electrical appliances 206, such as fans, lights, computers, etc. The electrical power system 202 also supplies electrical power to exemplary elements of cooling and heating units, such as chillers 214a-214c. The cooling and heating unit may include the chillers 214a-214c, one or more heat storage units 216, a coolant 208 and a heat exchanger 204. The exemplary chillers 214a-214c may chill a fluid for use at the heat exchanger 204. Heat exchanger 204 exchanges heat between fluid from the chillers 214a-214c and/or from the heat storage unit 216 and the coolant 208. The coolant 208 is then circulated throughout the building unit to regulate a temperature of the building unit.

In general, a building unit manager wishes to supply enough power to meet power demands of the building unit without incurring too much cost by supplying too much power. Thus, the building manager may estimate a power demand schedule and ramp up generators according to the estimated power demand schedule. However, the electricity and heating demands of a building unit is generally a stochastic process without any determinable behavior. Thus, without accounting for the stochastic nature of the power demands, the scheduled power supply may be in excess of demand, thus costing money and wasting electricity. The present disclosure provides a method of meeting a power demand of a building unit that takes into account the stochastic nature of electricity and cooling/heating demands of the building unit.

The present disclosure provides a cost function that includes various electrical costs for operating chillers, electrical cost savings due to local power generation using the local generators 210a-210c, as well as fuel costs for operating the local generators 210a-210c that includes startup fuel costs. It is possible to produce a power demand schedule for operating the various power supply equipment of the building unit by determining a substantial minimum of the cost function with respect to time. The cost function may be subjected to various constraints. For example, the heating supply from the chillers and, in some embodiments from the heat storage unit, may be equal to or greater than the heating requirements of the building unit. In addition, the power supplied from the electrical power system, including the power supply supplied from the local generators 210a-210c and/or battery 212, may be equal to or greater than the electrical power demands of the building unit. A first embodiment is represented by Eqs. (1)-(24).

An exemplary objective function of the first embodiment is shown in Eq. (1):

$$C_{power}\Sigma_t\Sigma_i p_{i,t} - C_{power}\Sigma_t\Sigma_k w_{k,t} + C_{fuel}(\Sigma_t\Sigma_j q_{j,t} + \Sigma_t\Sigma_i R_{turnon}^{(j)} u_{j,t})$$  Eq. (1)

The first term of the objective function of Eq. (1):

$$C_{power}\Sigma_t\Sigma_i p_{i,t}$$  Eq. (2)

represents an electrical cost for running chillers 214a-214c, wherein $C_{power}$ is a unit cost of electricity, and $p_{i,t}$ is an electrical power demand of the $i^{th}$ chiller ($p_i$) at time t. The second term:

$$-C_{power}\Sigma_t\Sigma_k w_{k,t}$$  Eq. (3)

represents a power savings obtained by operating power generators 210a-210c, wherein $w_{k,t}$ is a power supplied by the $k^{th}$ local power generator ($w_k$) at time t. The second term is negative to indicate savings from producing electricity locally rather than purchasing the electricity from a local electric company. The third term:

$$C_{fuel}(\Sigma_t\Sigma_j q_{j,t} + \Sigma_t\Sigma_i R_{turnon}^{(j)} u_{j,t})$$  Eq. (4)

represents fuel cost of operating generators 210a-210c to produce electricity. In Eq. (4), $C_{fuel}$ is a unit cost of fuel, $q_{j,t}$ is a fuel consumption of running the $j^{th}$ generator $q_j$ at time t. $R_{turnon}^{(j)}$ represents power consumption for turning on a $j^{th}$ generator and $u_{j,t}$ is a number that is 1 if the $j^{th}$ generator is being turned on at time t and is otherwise 0.

In an exemplary embodiment, various terms of the cost function may be represented by piece-wise linear functions. The power consumption $p_{i,t}$ of a chiller for example, may be represented by:

$$p_{i,t} = \Sigma_{k=1}^N (b_i^{(k-1)}\mu_{i,t}^{(k)} + b_i^{(k)}\lambda_{i,t}^{(k)}), \forall i,t$$  Eq. (5)

and chiller heat output $v_{i,t}$ may be represented by $$v_{i,t} = \Sigma_{k=1}^N (a_i^{(k-1)}\mu_{i,t}^{(k)} + a_i^{(k)}\lambda_{i,t}^{(k)}), \forall i,t$$  Eq. (6)

where i is an index for a particular chiller $p_i$, t is time and the index k enumerates the domains of the piece-wise linear function. In Eqs. (5) and (6), $a_i^{(k)}$ and $b_i^{(k)}$ are constants that represent a shape of the piece-wise linear function. In general, the piece-wise liner functions are constructed prior to calculating the power demand schedule. The piece-wise linear function may be constructed based on previous measurements or from a specification provided by a manufacturer. In general, the relation between the chiller power consumption and the chiller heat output is not piece-wise linear but can be sufficiently approximated using a piece-wise linear function. The limit N is the number of the segments of the piece-wise linear function. Increasing N improves the approximation of the piece-wise linear function to the relation between the chiller power consumption and the chiller heat output. However, computation time also increase with N. Therefore a value for N is generally chosen to provide a suitable approximation of the true function without excessive computation time. Variables μ and λ are subject to the following constraints:

$$\mu_{i,t}^{(k)} + \lambda_{i,t}^{(k)} = z_{i,t}^{(k)}, \forall i,t,k$$  Eq. (7)

and $$\mu_{i,t}^{(k)}, \lambda_{i,t}^{(k)} \geq 0, \forall i,t,k$$  Eq. (8)

where $$\Sigma_{k=1}^N z_{i,t}^{(k)} \leq 1, \forall i,t$$  Eq. (9)

and $$z_{i,t}^{(k)} \in \{0,1\} = 1, \forall i,t,k$$  Eq. (10)

Similarly, fuel consumption $q_{j,t}$ of a generator may be represented by:

$$q_{j,t} = \Sigma_{k=1}^N (d_j^{(k-1)}\alpha_{j,t}^{(k)} + d_j^{(k)}\beta_{j,t}^{(k)}), \forall j,t$$  Eq. (11)

and the power output $w_{i,t}$ of the generators 210a-210c may be represented by:

$$w_{i,t} = \Sigma_{k=1}^N (c_j^{(k-1)}\alpha_{j,t}^{(k)} + c_j^{(k)}\beta_{j,t}^{(k)}), \forall j,t$$  Eq. (12)

wherein variables $c_j^{(k)}$ and $d_j^{(k)}$ are constants that represent a shape of the piece-wise linear function. In general, the relation between the generator fuel consumption and the generator power output is not piece-wise linear but can be sufficiently approximated using a piece-wise linear function. Variables α and β are subject to the following constraints:

$$\alpha_{j,t}^{(k)} + \beta_{j,t}^{(k)} = u_{j,t}^{(k)}, \forall j,t,k$$  Eq. (13)

$$\alpha_{j,t}^{(k)}, \beta_{j,t}^{(k)} \geq 0, \forall j,t,k$$  Eq. (14)

$$\Sigma_{k=1}^N u_{j,t}^{(k)} \leq 1, \forall j,t$$  Eq. (15)

$$u_{j,t}^{(k)} \in \{0,1\} = 1, \forall j,t,k$$  Eq. (16)

In addition to the constraints on the piece-wise linear functions, the present disclosure includes a constraint on electrical power demand:

$$\sum_i p_{i,t} + E_t - \sum_k w_{k,t} \leq E_{max}, \forall t \quad \text{Eq. (17)}$$

wherein the power consumed by the chillers and the power demand by non-chiller electrical appliances minus power savings due to local power generators is less than or equal to the maximum power that may be purchased from a local electrical company ($E_{max}$). Generator output $w_{j,t}$ is further constrained by:

$$c_j^{(0)} y_{j,t} \leq w_{j,t} \leq c_j^{(N)} y_{j,t}, \forall j,t \quad \text{Eq. (18)}$$

wherein $y_{j,t}=0$ when the generator is off and $y_{j,t}=1$ when the generator is on. Variable $u_{j,t}$ may be described as in Eq. (19)

$$u_{j,t} \geq y_{j,t} - y_{j,t-1}, \forall j,t \quad \text{Eq. (19)}$$

wherein $u_{j,t}=1$ if the $j^{th}$ generator is being turned on at time t and is otherwise equal to zero. The generator is further constrained by its ability to alter its electrical power production between a selected time t−1 and a consecutive time t, as described in Eq. (20):

$$w_{j,t} \leq w_{j,t-1} + \Delta W_{j,max}, \forall j,t \quad \text{Eq. (20)}$$

wherein $\Delta W_{j,max}$ indicates the maximum increment of output of generator $w_j$ between time periods.

While Eqs. (17)-(20) provide constraints on electrical power production. Similarly, Eqs. (21)-(24) provide constraints to heat production. In Eq. (21), the sum of heat output from the chillers at time t is equal to the total heat demand at time t:

$$\sum_i v_{i,t} = Q_t, \forall t \quad \text{Eq. (21)}$$

where $Q_t$ is heat demand at time t. The chiller heat output $v_{i,t}$ is constrained by the Eq. (22):

$$a_i^{(0)} x_{i,t} \leq v_{i,t} \leq a_i^{(N)} x_{i,t}, \forall i,t \quad \text{Eq. (22)}$$

wherein $x_{i,t}=0$ when the $i^{th}$ chiller is off at time t and is otherwise 0, and $x_{i,t}=1$ when the $i^{th}$ chiller is on at time t. Eq. (23) may be used to characterize a state of the chiller $$s_{i,t} \geq x_{i,t} - x_{i,t-1}, \forall i,t \quad \text{Eq. (23)}$$

where $s_{i,t}=1$ if the $i^{th}$ chiller is being turned on at time t. The chiller output is further constrained by the ability of the chiller to alter its heat production between a selected time t−1 and a consecutive time t, as described in Eq. (24):

$$v_{j,t} \leq v_{j,t-1} + \Delta V_{i,max}, \forall i,t \quad \text{Eq. (24)}$$

wherein $\Delta V_{i,max}$ indicates a maximum increment of output of the $i^{th}$ chiller of a time period. Substantially minimizing the cost function of Eq. (1) under the various constraints of Eqs. (5)-(24) yields a schedule for operating the various electrical components of the building unit.

Figure 3:
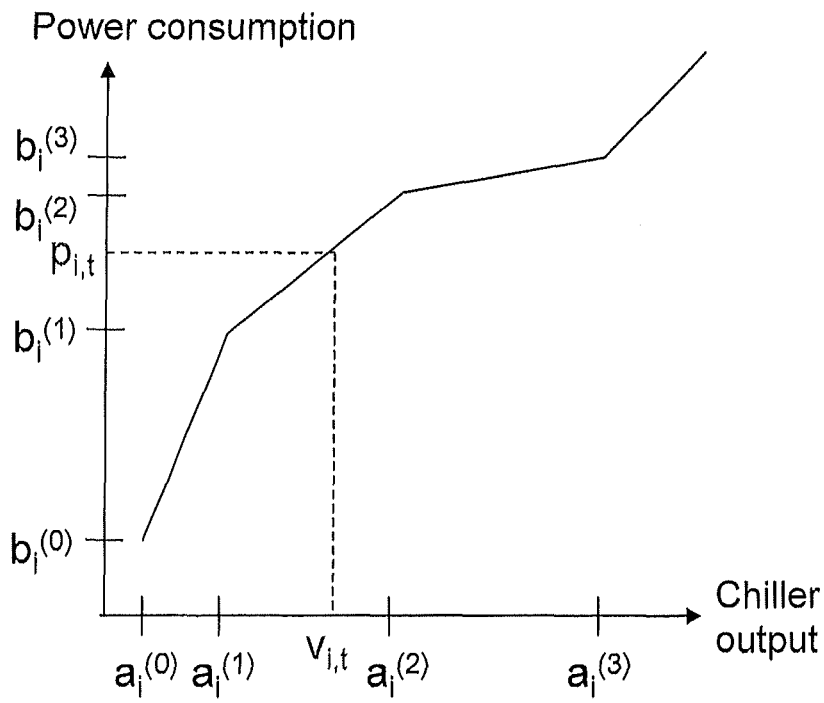
FIG. 3 shows an exemplary piecewise function relating the chiller output to chiller power consumption at the exemplary power consumption unit.

FIG. 3 shows an exemplary piecewise function relating chiller output to chiller power consumption, as described in exemplary Eqs. (5) and (6). Chiller output is plotted along the x-axis and is described using constants $a_i^{(k)}$ over each of the $k^{th}$ piecewise intervals. Chiller power consumption is plotted along the y-axis and is described using constants $b_i^{(k)}$ over each of the $k^{th}$ piecewise intervals. The piece-wise linear function tells how much (electric) power is consumed to generate a given amount of heat by the chiller. In FIG. 3, chiller output and power consumption form a linear relationship over each piecewise interval.

Figure 4:
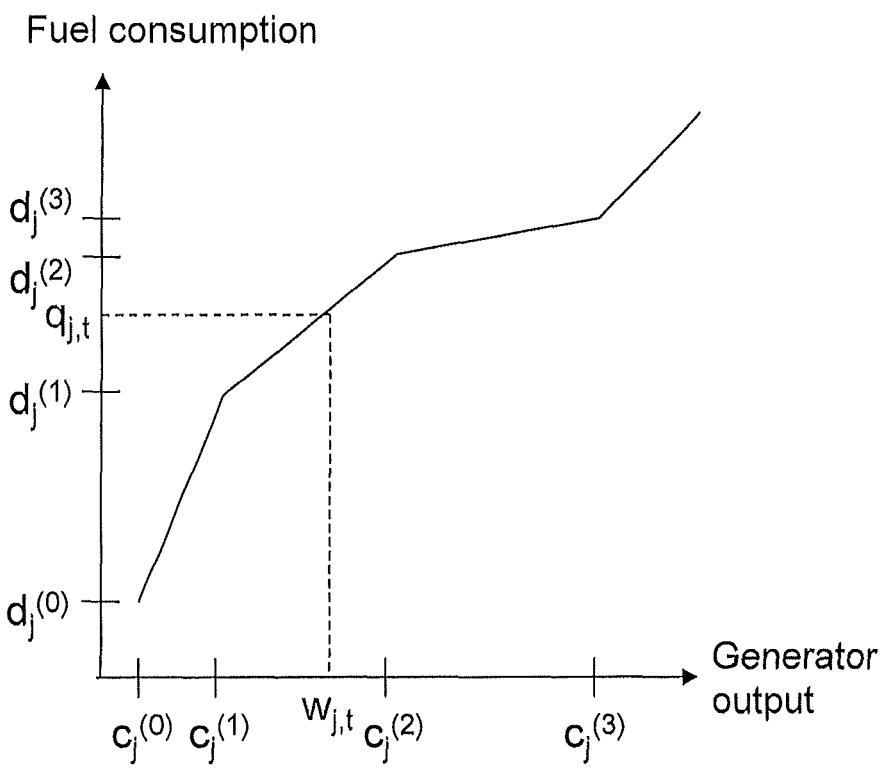
FIG. 4 shows an exemplary piecewise function relating fuel consumption and generator electricity output at the exemplary power consumption unit.

FIG. 4 shows an exemplary piecewise function relating fuel consumption and generator electricity output, as described in exemplary Eqs. (11) and (12). Generator output $w_{j,t}$ is plotted along the x-axis and is described using constants $c_j^{(k)}$ over each of the $k^{th}$ piecewise intervals. Fuel consumption of the generators is plotted along the y-axis and is described using constants $d_j^{(k)}$ over each of the $k^{th}$ piecewise intervals.

The first embodiment, described using Equations (1)-(24), therefore discloses a method of substantially minimizing a cost function for determining a power supply schedule for building unit using a mixed integer program. The optimal solution to the mixed integer program assigns values, either 0 or 1, to each of the variables $x_{i,t}$ and $y_{i,t}$. That $x_{i,t}=1$ suggests that the $i^{th}$ chiller should be turned during the $t^{th}$ period. That $y_{i,t}=1$ suggests that the $j^{th}$ generator should be turned during the $t^{th}$ period. The chillers and the generators can thus be turned on and off accordingly to substantially minimize the cost function.

A second embodiment solves the same problem as the first embodiment but uses a fewer number of free variables. An advantage of the second embodiment is that it generally requires less computation time to obtain a solution. In order to reduce variables, Eqs. (5)-(10) of the first embodiment may be replaced by the Eqs. (25)-(31) listed below. Eqs. (5) and (6) are thus replaced by Eqs. (25)-(27):

$$p_{i,t} = \sum_{k=1}^M p_{i,t}^{(k)}, \forall i,t \quad \text{Eq. (25)}$$

$$p_{i,t}^{(k)} \geq b_i^{(k,l-1)} \mu_{i,t}^{(k)} + b_i^{(k,l)} \lambda_{i,t}^{(k)}, \forall i,t,k,l \quad \text{Eq. (26)}$$

$$v_{i,t} = \sum_{k=1}^M (a_i^{(k-1)} \mu_{i,t}^{(k)} + a_i^{(k)} \lambda_{i,t}^{(k)}), \forall i,t \quad \text{Eq. (27)}$$

where $p_{i,t}$ is power consumption of the $i^{th}$ chiller $p_i$ at time t and M is a number that may be determined from a shape of the piece-wise linear function and M≤N. Eqs. (25)-(27) represent a relation between chiller energy consumption $p_{i,t}$ and heat production $v_{i,t}$. Although Eq. (26) is an inequality, an optimal solution to the mixed integer program satisfies this constraint at the equality. This property may be used to reduce the number of free variables. The constraint equations (7)-(10) of μ and λ are replaced by Eqs. (28)-(31):

$$\mu_{i,t}^{(k)} + \lambda_{i,t}^{(k)} = z_{i,t}^{(k)}, \forall i,t,k \quad \text{Eq. (28)}$$

and $$\mu_{i,t}^{(k)}, \lambda_{i,t}^{(k)} \geq 0, \forall i,t,k \quad \text{Eq. (29)}$$

where $$\sum_{k=1}^M z_{i,t}^{(k)} \leq 1, \forall i,t \quad \text{Eq. (30)}$$

and $$z_{i,t}^{(k)} \in \{0,1\} = 1, \forall i,t,k \quad \text{Eq. (31)}$$

Figure 5:
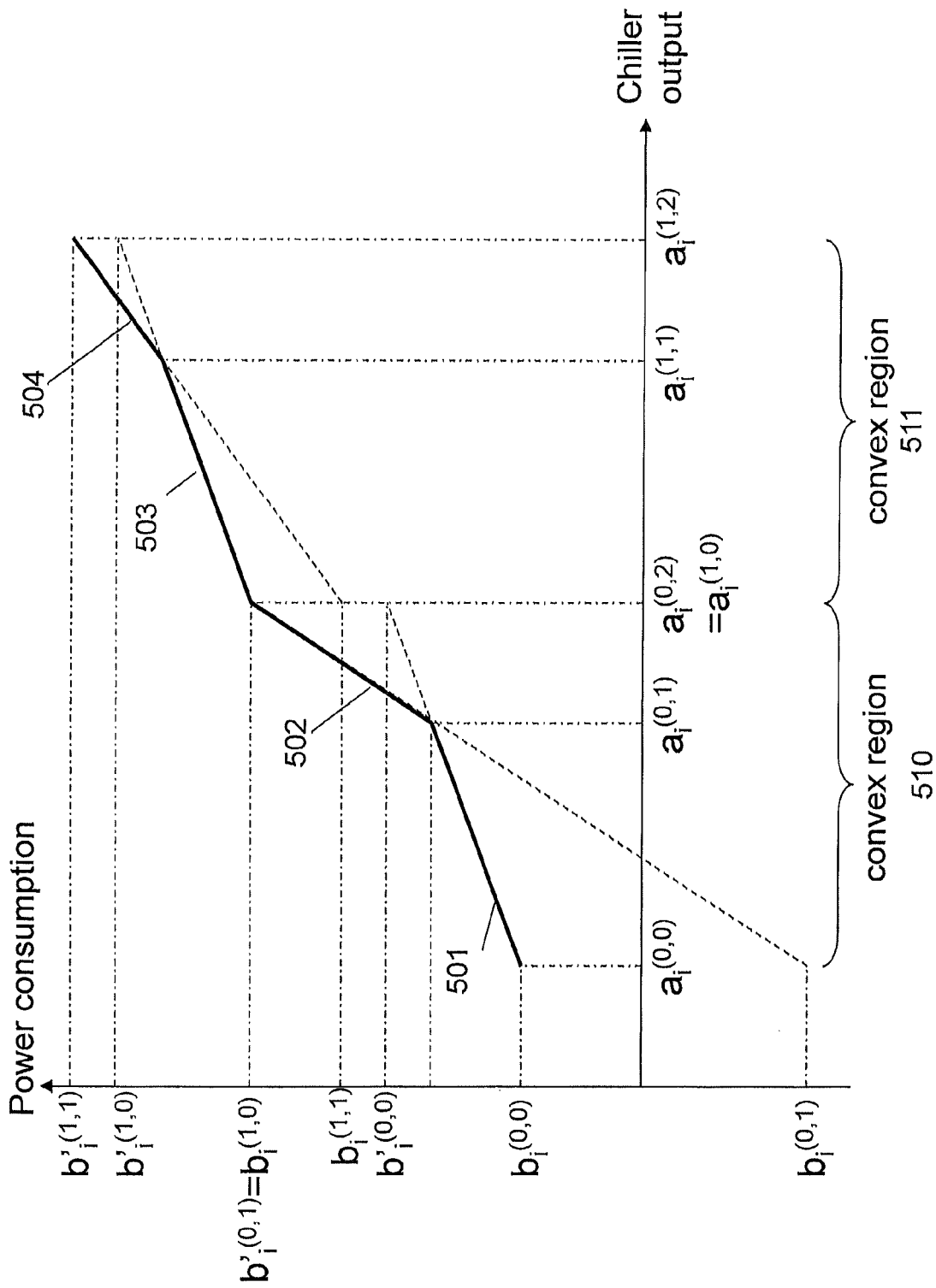
FIG. 5 shows a piecewise linear function suitable for performing calculations with respect to one embodiment of the present disclosure.

FIG. 5 shows a piecewise linear function suitable for performing calculations with respect to the second embodiment. Adjacent piecewise regions may be rewritten as a single convex region as shown in FIG. 5. Adjacent linear functions 501 and 502 form an upwardly convex region 510. Linear functions 503 and 504 similarly form an upwardly convex region 511. Thus, the power consumption term may be summed over M regions rather than the N regions of Eq. (5), wherein M<=N. Thus, the number of free variables is reduced in the second embodiment. Therefore, the computation time to solve the mixed integer program may be shorter in the second embodiment in comparison to the computation time for the first embodiment. The second embodiment therefore substantially minimizes the cost function of Eq. (1) subject to the accompanying Eqs. (11)-(24) and (25)-(31) to determine a power supply schedule and operates the power system 202, generators 210a-210c and one or more chillers 214a-214c according to the determined schedule.

A third embodiment solves the same problem as the first and second embodiments. The number of free variables in the third embodiment is fewer than the number of free variables in the second embodiment. Therefore, the time to solve the mixed integer program in the third embodiment is shorter the time required in the second embodiment. For the third embodiment, Eqs. (5)-(10) may be replaced by the following equations Eqs. (32)-(40):

$$p_{i,t} = \Sigma_{k=1}^{M} p_{i,t}^{(k)}, \forall i,t \quad \text{Eq. (32)}$$

$$p_{i,t}^{(k)} \geq b_i^{(k,l-1)} \mu_{i,t}^{(k)} + b_i^{(k,l)} \lambda_{i,t}^{(k)}, \forall i,t,k,l \quad \text{Eq. (33)}$$

$$v_{i,t} = \Sigma_{k=1}^{M} (a_i^{(k-1)} \mu_{i,t}^{(k)} + a_i^{(k)} \lambda_{i,t}^{(k)}), \forall i,t \quad \text{Eq. (34)}$$

$$\Sigma_{k \in B_m} (\mu_{i,t}^{(k)} + \lambda_{i,t}^{(k)}) = z_{i,t}^{(m)}, \forall i,t,m \quad \text{Eq. (35)}$$

$$\Sigma_{k \notin B_m} (\mu_{i,t}^{(k)} + \lambda_{i,t}^{(k)}) = 1 - z_{i,t}^{(m)}, \forall i,t,m \quad \text{Eq. (36)}$$

$$\Sigma_{k=1}^{M} (\mu_{i,t}^{(k)} + \lambda_{i,t}^{(k)}) = 1, \forall i,t \quad \text{Eq. (37)}$$

$$\mu_{i,t}^{(k)}, \lambda_{i,t}^{(k)} \geq 0, \forall i,t,k \quad \text{Eq. (38)}$$

$$\Sigma_{m=1}^{\log_2 M} z_{i,t}^{(m)} \leq 1, \forall i,t \quad \text{Eq. (39)}$$

$$z_{i,t}^{(m)} \in \{0,1\} \leq 1, \forall i,t,m \quad \text{Eq. (40)}$$

where M is the number of convex regions, such as regions 510 and 511 of FIG. 5, and $B_m$ is a set of integers whose $m^{th}$ bit of binary representation is 1. Thus, the third embodiment substantially minimizes Eq. (1) subject to the accompanying equations (11)-(24) and (32)-(40) to determine a power supply schedule and operates the power system 202, generators 210a-210c and one or more chillers 214a-214c according to the determined schedule. In alternate embodiments, equation substitution similar to the equation substitutions of the second and third embodiment may be made with respect to Eqs. (11)-(16) of the first embodiment to reduce computation time.

In a fourth embodiment, the cost function of Eq. (1) is substantially minimized to include the effects of using batteries 212 and/or heat storage devices 216. The fourth embodiment is obtained from the equations of the first embodiments by replacing heat constraint Eq. (17) and electrical power constraint Eq. (21) by the following equations:

$$\Sigma_i p_{i,t} + E_t - \Sigma_k w_{k,t} - \Sigma_m e_{m,t} \leq E_{max}, \forall t \quad \text{Eq. (41)}$$

$$\Sigma_i v_{i,t} + \Sigma_i f_{i,t} = Q_t, \forall t \quad \text{Eq. (42)}$$

wherein the additional term $\Sigma_m e_{m,t}$ in Eq. (17) represents a power supplied by one or more batteries 212 and the additional term $\Sigma_i f_{i,t}$ represents a heat supplied by one or more heat storage devices 216. The addition of the one or more batteries 212 and/or heat storage devices 216 provides additional constraint equations, Eqs. (43)-(46).

$$0 \leq f_{m,t} \leq \min\{K_{max}^{(p)}, h_{m,t}\}, \forall m,t \quad \text{Eq. (43)}$$

wherein $K_{max}^{(p)}$ is the maximum heat output rate of the heat storage device and $h_{m,t}$ is an amount of heat in the $m^{th}$ heat storage device $f_m$. Eq. (44) describes an amount by which the heat in the heat storage devices can change over a particular time period.

$$h_{m,t+1} = h_{m,t} - f_{m,t}, \forall m,t \quad \text{Eq. (44)}$$

Similarly, battery output is constrained by:

$$0 \leq e_{n,t} \leq \min\{L_{max}^{(q)}, g_{n,t}\}, \forall n,t \quad \text{Eq. (45)}$$

wherein $L_{max}^{(q)}$ is the maximum rate of power output of the batteries and $g_{n,t}$ is an amount of electricity in a particular battery. Eq. (46) describes an amount by which the battery power can be changed over a particular time period.

$$g_{n,t+1} = g_{n,t} - e_{n,t}, \forall n,t \quad \text{Eq. (46)}$$

Therefore, in the fourth embodiment, the cost function Eq. (1) is minimized using constraint Eqs. (5)-(16), (18)-(20), (22)-(24) and (41)-(46) to determine a power supply schedule. The power system 202 is then operated using generators 210a-210c, one or more chillers 214a-214c and one or more of batteries 212 and heat storage devices 216 according to the determined schedule.

A fifth embodiment determines a power supply schedule including effects of a stochastic energy demand of the building unit. A stochastic scenario ω describes a power demand of the building unit. Exemplary stochastic scenario may include an increase in air conditioning demands due to changing weather condition or an increase in electricity demands due to increased machinery operations resulting from an unexpected increase in demand for an office's product. These exemplary scenarios are stochastic in nature since it is not possible to know weather conditions or market forces. Thus, the fifth embodiment includes stochastic chiller energy consumption $p_{i,t}(\omega)$, stochastic energy savings $w_{k,t}(\omega)$ for using local generators and stochastic fuel consumption terms $q_{j,t}(\omega)$ with respect to a selected scenario. A probability term $P(\omega)$ represents a probability of occurrence of the selected scenario.

The fifth embodiment is represented by Eqs. (47)-(72). Eq. (47) describes an objective function that includes stochastic power demands:

$$C_{power} \Sigma_t \Sigma_i \Sigma_\omega P(\omega) p_{i,t}(\omega) - C_{power} \Sigma_t \Sigma_k \Sigma_\omega P(\omega) w_{k,t}(\omega) + C_{fuel} (\Sigma_t \Sigma_j \Sigma_\omega P(\omega) q_{j,t}(\omega) + \Sigma_t \Sigma_i \Sigma_\omega R_{turnon}^{(j)} s_{j,t}) \quad \text{Eq. (47)}$$

The first term of the objective function of Eq. (47):

$$C_{power} \Sigma_t \Sigma_i \Sigma_\omega P(\omega) p_{i,t}(\omega) \quad \text{Eq. (48)}$$

represents an expected cost of power generation for a chiller $p_{i,t}$ for a stochastic power demand scenario ω. $P(\omega)$ represents a probability of an occurrence of the scenario ω. The second term:

$$-C_{power} \Sigma_t \Sigma_k \Sigma_\omega P(\omega) w_{k,t}(\omega) \quad \text{Eq. (49)}$$

represents an expected power savings obtained for operating a local power generator according to a stochastic power demand scenario ω. Variable $w_{k,t}(\omega)$ is the power provided by generator $w_k$ at time t for a scenario ω. The second term is negative to represent power savings due to local generation of power instead of buying electricity from a power company. The third term:

$$C_{fuel} (\Sigma_t \Sigma_j \Sigma_\omega P(\omega) q_{j,t}(\omega) + \Sigma_t \Sigma_i \Sigma_\omega R_{turnon}^{(j)} s_{j,t}) \quad \text{Eq. (50)}$$

represents an expected fuel cost for operating the local power generators 210a-210c according to the stochastic scenario ω. $C_{fuel}$ is a unit cost of fuel, $q_{j,t}(\omega)$ is a fuel consumption for operating the $j^{th}$ generator $q_j$ at time t. $R_{turnon}^{(j)}$ represents power consumption used in turning on the $j^{th}$ generator at time t.

Various terms of the objection function may be represented by piece-wise linear functions. Piecewise linear functions for the stochastic chiller power consumption $p_{i,t}(\omega)$ and a stochastic chiller heat output $v_{j,t}(\omega)$ of the chiller are represented in Eqs. (51) and (52).

$$p_{i,t}(\omega) = \Sigma_{k=1}^{N} (b_i^{(k-1)} \mu_{i,t}^{(k)}(\omega) + b_i^{(k)} \lambda_{i,t}^{(k)}(\omega)), \forall i,t,\omega \quad \text{Eq. (51)}$$

$$v_{i,t}(\omega) = \Sigma_{k=1}^{N} (a_i^{(k-1)} \mu_{i,t}^{(k)}(\omega) + a_i^{(k)} \lambda_{i,t}^{(k)}(\omega)), \forall i,t,\omega \quad \text{Eq. (52)}$$

Variables $a_i^{(k)}$ and $b_i^{(k)}$ are constants that represent a shape of the piece-wise linear function. Variables μ and λ are subject to the following constraints of Eqs. (53)-(56):

$$\mu_{i,t}^{(k)}(\omega)+\lambda_{i,t}^{(k)}(\omega)=z_{i,t}^{(k)}(\omega),\forall i,t,k,\omega \quad \text{Eq. (53)}$$

$$\mu_{i,t}^{(k)}(\omega),\lambda_{i,t(k)}(\omega)\geq 0,\forall i,t,k,\omega \quad \text{Eq. (54)}$$

$$\Sigma_{k=1}^{N}z_{i,t}^{(k)}(\omega)\leq 1,\forall i,t,\omega \quad \text{Eq. (55)}$$

$$z_{i,t}^{(k)}(\omega)\in\{0,1\}=1,\forall i,t,k,\omega \quad \text{Eq. (56)}$$

Similarly, Eqs. (57)-(61) provide piece-wise linear functions for fuel consumption $q_{j,t}(\omega)$ of the local generator in a given scenario ω, electrical power output $w_{k,t}(\omega)$ of the local generator in a given scenario ω and various constraints to electrical power generation. Eqs. (57)-(58) represent fuel consumption $q_{j,t}(\omega)$ of the local generator and electrical power output $w_{k,t}(\omega)$ of the local generator, respectively:

$$q_{j,t}(\omega)=\Sigma_{k=1}^{N}(d_j^{(k-1)}\alpha_{j,t}^{(k)}(\omega)+d_j^{(k)}\beta_{j,t}^{(k)}(\omega)),\forall j,t,\omega \quad \text{Eq. (57)}$$

$$w_{i,t}(\omega)=\Sigma_{k=1}^{N}(c_j^{(k-1)}\alpha_{j,t}^{(k)}(\omega)+c_j^{(k)}\beta_{j,t}^{(k)}(\omega)),\forall j,t,\omega \quad \text{Eq. (58)}$$

wherein $c_i^{(k)}$ and $d_i^{(k)}$ are constants and variables terms α and β are subject to the following constraints:

$$\alpha_{j,t}^{(k)}(\omega)+\beta_{j,t}^{(k)}(\omega)=u_{j,t}^{(k)}(\omega),\forall j,t,k,\omega \quad \text{Eq. (59)}$$

$$\alpha_{j,t}^{(k)}(\omega),\beta_{j,t}^{(k)}(\omega)\geq 0,\forall j,t,k,\omega \quad \text{Eq. (60)}$$

$$\Sigma_{k=1}^{N}u_{j,t}^{(k)}(\omega)\leq 1,\forall j,t,\omega \quad \text{Eq. (61)}$$

$$u_{j,t}^{(k)}(\omega)\in\{0,1\}=1,\forall j,t,k,\omega \quad \text{Eq. (62)}$$

Additionally, a chiller output constraint is given by:

$$\Sigma_i v_{i,t}(\omega)=Q_t(\omega),\forall t \quad \text{Eq. (63)}$$

in which:

$$a_i^{(0)}x_{i,t}\leq v_{i,t}(\omega)\leq a_i^{(N)}x_{i,t},\forall i,t,\omega \quad \text{Eq. (64)}$$

$$v_{j,t}(\omega)\leq b_{j,t-1}(\omega)+\Delta V_{i,max},\forall i,t,\omega \quad \text{Eq. (65)}$$

$$r_{j,t}\leq x_{i,t}-x_{i,t-1},\forall i,t \quad \text{Eq. (66)}$$

$$x_{i,t},r_{j,t}\leq\{0,1\},\forall i,t \quad \text{Eq. (67)}$$

A power generation constraint is given by:

$$\Sigma_i p_{i,t}(\omega)+E_t(\omega)-\Sigma_k w_{k,t}(\omega)\leq E_{max},\forall t,\omega \quad \text{Eq. (68)}$$

in which $$c_j^{(0)}y_{j,t}\leq w_{j,t}(\omega)\leq c_j^{(N)}y_{j,t},\forall j,t,\omega \quad \text{Eq. (69)}$$

$$s_{j,t}\leq y_{j,t}-y_{j,t-1},\forall j,t \quad \text{Eq. (70)}$$

$$y_{j,t},s_{j,t}\leq\{0,1\},\forall j,t \quad \text{Eq. (71)}$$

$$w_{j,t}(\omega)\leq w_{j,t-1}(\omega)+\Delta W_{j,max},\forall j,t,\omega \quad \text{Eq. (72)}$$

Thus, in a fifth embodiment, cost function of Eq. (47) is substantially minimized subject to the constraints of Eqs. (48)-(72). The equations of the fifth embodiment may be replaced to obtain additional embodiments similar to the methods by which the equations of the first embodiment are replaced to obtain embodiments 2-4 in order to reduce computation time and to include power terms for one or more batteries and/or heat storage units.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of meeting a power demand of a power consumption unit, comprising:
   providing a chiller for regulating a temperature of the power consumption unit, a heat storage unit for supplying heat to the chiller, and an electric power system of the power consumption unit for providing electrical power to the power consumption unit and to the chiller;
   determining, by a processing device, a forecasted power demand for a power demand scenario for the power consumption unit;
   determining a probability of occurrence of the power demand scenario;
   creating an objective function for operating a power supply device to supply power to the electric power system, wherein the objective function includes the forecasted power demand of the power demand scenario and the determined probability of occurrence of the power demand scenario;
   locating a substantial minimum of the objective function to determine a schedule for operating the power supply device to meet the forecasted power demand, wherein a relation between a fuel consumption of the power supply device and a power output of the power supply device is represented using a piece-wise linear function; and
   operating the power supply device according to the determined schedule to meet the power demand of the power consumption unit.

2. The method of claim 1, wherein the objective function includes a heat loss at the chiller.

3. The method of claim 1, wherein at least one power supply further comprises a generator and the objective function includes a power loss at the generator.

4. The method of claim 1, wherein the objective function includes terms for at least one of a generator, a battery, the chiller unit and the heat storage unit.

5. The method of claim 1, wherein the forecasted power demand is at least one of: (i) an electrical power demand; and (ii) a power demand for regulating an environment of the power consumption unit.

6. The method of claim 1, further comprising reducing a number of intervals of the piece-wise linear function to reduce a computation time for locating the substantial minimum of the objective function.

7. The method of claim 1, further comprising reducing a selected set of adjacent interval into intervals over which the piecewise linear function is convex.

8. The method of claim 1, wherein the objective function is subject to a heat constraint and an energy constraint.

9. The method of claim 1, wherein the power consumption unit further comprises a building that includes a local electrical generator as the power supply device and at least one device for supplying power that regulates an environment of the building.

10. A method of determining a power demand of a power consumption unit, comprising:
   determining, by a processing device, a forecasted power demand for a selected power demand scenario for the power consumption unit;
   determining a probability of occurrence of the selected power demand scenario;
   creating an objective function for operating at least one power production device to meet the forecasted power demand and the determined probability of occurrence of the power demand scenario, wherein the at least one power production device supplies power to an electric power system of the power consumption unit and the electric power system provides electrical power to the power consumption unit and to a chiller for regulating a temperature of the power consumption unit, the chiller receiving heat from a heat storage unit; and
   finding a substantial minimum of the objective function to determine a schedule for operating the at least one power production device to determine the power demand of the power consumption unit, wherein a relation between a fuel consumption of the power production device and a power output of the power production device is represented using a piece-wise linear function.

11. The method of claim 10, wherein the at least one power production device further comprises the chiller of a heating unit and the objective function includes a heat loss at the chiller.

12. The method of claim 10, wherein at least one power production device further comprises a generator and the objective function includes a power loss at the at the generator.

13. The method of claim 10, wherein the objective function includes terms for at least one of a generator, a battery, the chiller unit and the heat storage unit.

14. The method of claim 10, wherein the expected power demand is at least one of: (i) an electrical power demand; and (ii) a power demand for regulating an environment of the power consumption unit.

15. The method of claim 10, further comprising reducing a number of intervals of the piece-wise linear function to reduce a computation time for locating the substantial minimum of the objective function.

16. The method of claim 10, further comprising reducing a selected set of adjacent interval into intervals over which the piecewise linear function is convex.

17. The method of claim 10, wherein the objective function is subject to a heat constraint and an energy constraint.

18. The method of claim 10, wherein the power consumption unit further comprises a building that includes a local electrical generator as the power production device and at least one device for supplying power that regulates an environment of the building.

* * * * *